United States Patent [19]

LaFlame

[11] 4,227,861
[45] Oct. 14, 1980

[54] COOLING FAN WITH VISCOUS-MAGNETIC FAN CLUTCH

[75] Inventor: Frank E. LaFlame, Dayton, Ohio

[73] Assignee: General Motors Corporation, Detroit, Mich.

[21] Appl. No.: 12,156

[22] Filed: Feb. 14, 1979

[51] Int. Cl.³ .................. F01D 7/08; F16D 29/00
[52] U.S. Cl. ............................ 416/169 A; 123/41.12; 192/48.3; 192/58 B; 192/82 T; 416/32
[58] Field of Search ........... 416/32, 39, 169 R, 169 A; 123/41.12, 41.11, 41.49; 192/48.3, 58 B, 82 T

[56] References Cited

U.S. PATENT DOCUMENTS

| | | | |
|---|---|---|---|
| 3,120,219 | 2/1964 | Nallinger | 416/32 X |
| 3,250,355 | 5/1966 | Weir | 192/58 B |

FOREIGN PATENT DOCUMENTS 2804859  8/1979  Fed. Rep. of Germany ......... 192/58 B

*Primary Examiner*—Leonard E. Smith
*Attorney, Agent, or Firm*—Charles R. White

[57] ABSTRACT

Engine cooling fan with viscous-magnetic clutch which is electrically energized on closure of thermal switch mounted within engine coolant. As fan coil housing is driven on engagement of the magnetic clutch, silicone fluid is centrifugally displaced into working area of viscous clutch for fluid drive of fan body. Because of slippage in the fluid drive, fan speeds will gradually increase from minimum to maximum speeds. With progressive increase in speed, conventional fan blading can be employed without excessive fan generated noise.

3 Claims, 3 Drawing Figures

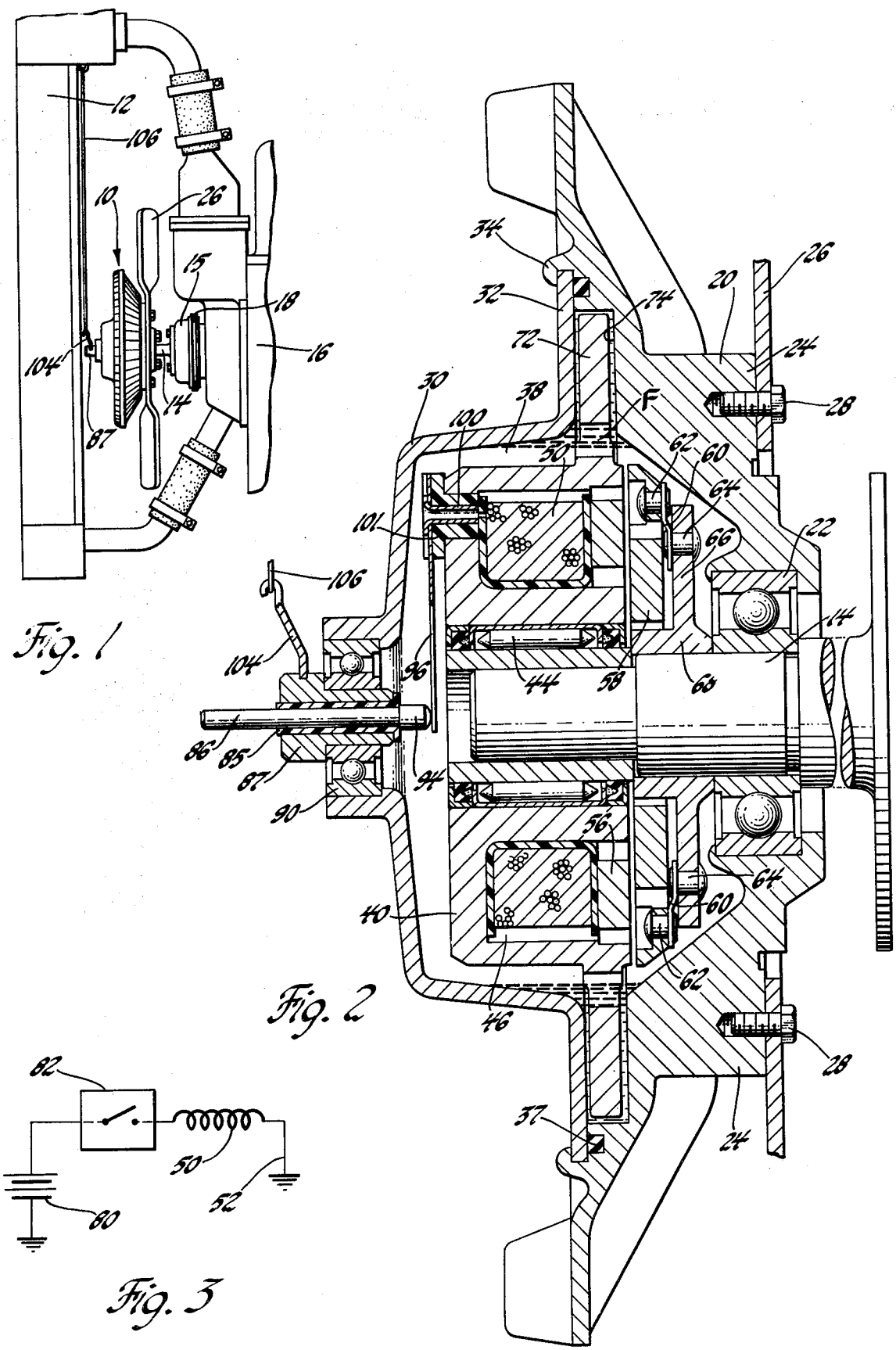

COOLING FAN WITH VISCOUS-MAGNETIC FAN CLUTCH

This invention relates to fan constructions and more particularly to a new and improved viscous-magnetic clutch for automotive radiator cooling fans.

Prior to the present invention, many different fan constructions have been employed to effect the flow of cooling air through an automotive radiator to reduce the temperature of the coolant circulated therein. To improve engine efficiency, many fan constructions employ clutches which engage for fan drive when the engine coolant temperature is above a predetermined temperature and disengage when below that temperature. Among the various clutches used in such fans are viscous clutches which provide slippage for the gradual and progressive angular acceleration of the fan which permit the use of conventional fan blading. Magnetic clutches are also employed but more expensive and complex fans with flex blading are required for reduced noise since there is minimal slippage with magnetic clutch. Generally, when the electromagnetic coil of such clutches are energized, the fan is instantaneously brought up to speed without slip so that flexible blading must be employed for noise reductions.

In the preferred embodiment of this invention, a fan drive shaft, preferably an extension of an engine drive water pump shaft, has a fan body rotatably mounted thereon which encases a housing for the coil of an electromagnetic clutch. This housing is supported for rotation on the fan drive shaft and a drive shoe disposed within the main body is pressed onto the fan drive shaft for rotation therewith. The drive shoe carries drive plate means by suitable torque springs. The torque springs flex to allow the drive plate means to drivingly engage the adjacent front plate of the coil housing on coil energization for magnetic clutching. A radially extending viscous clutch plate rotates within a radial working chamber and on rotation of the viscous clutch, silicone fluid is centrifugally displaced into this working chamber so that there is a fluid drive of the main body and the fan blading attached thereto. Slippage of the viscous clutch provides for the progressive increase in fan body speed from a minimum to maximum speed for efficient radiator cooling and allows the use of conventional fan blading without attendant noise generation.

When the electromagnetic clutch is disengaged, hydraulic drive terminates. The fan may be rotatably driven by ram air, however, no power will be absorbed from engine operation so that the engine will operate with increased efficiency.

It is a feature, object and advantage of this invention to provide a new and improved fan construction with electrically controlled viscous clutch for a vehicle engine cooling fan with conventional blading to draw air through an adjacent engine cooling radiator.

Another feature, object and advantage of this invention is to provide an electromagnetic-viscous fan clutch for a vehicle radiator cooling fan with substantially rigid fan blades which features low disengaged rpm and viscous slip in the engaged mode to reduce fan noises.

Another feature, object and advantage of this invention is to provice a new and improved electrically controlled viscous fan clutch which can be used with a rigid metallic fan blades as well as flexible blades and in which there is improved control using coolant temperature in lieu of air temperature from the radiator.

Another feature, object and advantage of this invention is to provide a new and improved electrically controlled viscous fan clutch which provides the advantages of electromagnetic clutches with quick engagement and disengagement features and with the advantage of viscous clutches allowing the fan blading to progressively slip into speed.

These and other objects, features and advantages of this invention will become more apparent from the following detailed description and drawings in which:

FIG. 1 is a fragmentary side elevational view of a radiator and engine having a viscous-magnetic fluid clutch driven cooling fan associated therewith;

FIG. 2 is an enlarged fragmentary cross sectional view of the viscous-magnetic fluid clutch of FIG. 1 embodying this invention; and FIG. 3 is a diagram illustrating the electrical control circuitry of this invention.

Turning now in greater detail to the drawings, there is shown in FIG. 1 a multi-bladed fan and clutch assembly 10 for drawing cooling air through the core of a vehicle radiator 12 through which engine cooling fluid is circulated. This assembly 10 is mounted on the outboard end of a rotatable shaft 14 whose inner end terminates in a flange secured to water pump pulley 15. Pulley 15 and shaft 14 attached thereto are rotatably driven by vehicle engine 16 through drive belt 18. The fan and clutch assembly comprises an annular main body 20 centrally mounted for rotation on shaft 14 by bearing 22. The main body 20 is formed with a plurality of radially extending external bosses 24 to which a bladed fan 26 is attached by threaded fasteners 28. A cover 30 is mounted to the front of the main body 20 and cooperates therewith to house an electromagnetic-viscous clutch assembly for drivingly connecting and disconnecting the fan and the shaft 14.

As shown, the cover 30 is a thin-walled cup-shaped member which has a radial disc-like flange 32 peripherally secured to main body 30 by suitable fastening such as by the upset or spun over portion 34 of the main body 20. Annular seal 37 is interposed between radial flange and the front face of body to prevent fluid leakage outwardly therefrom. The main body and cover cooperate to form a chamber 38 for a toroidal coil housing 40 mounted for rotation on the end of the water pump shaft by a caged needle bearing assembly 44. The housing 40 has a toroidal chamber 46 to receive the coil 50 which is grounded to the vehicle engine 16 through a lead 52, the needle bearing 44 and shaft 14. An annular coil plate 56; suitably secured to coil housing 40, closes the backside of the coil housing 40 and is disposed between the coil 50 and an annular drive plate 58. The drive plate 58 is supported for movement into and out of engagement with the coil plate by a plurality of torque spring arms 60. Pins 62 connect the outer ends of torque spring arms to the drive plate while pins 64 connect the inner ends of the spring arms to a drive shoe 66. The drive shoe has a hub portion 68 pressed onto the water pump shaft 14 so that the drive shoe rotates with this shaft.

The coil housing 40 is formed with a radially extending viscous clutch plate 72 that projects into an annular cavity 74 formed by main body 20 and the radial flange 32 of the cover 30. A suitable silicone or other hydraulic fluid F, when centrifugally displaced into annular cavity 74, is sheared in response to predetermined rotational velocity of clutch plate 72 so that drive torque is transmitted to the main body 20 to effect rotation of the fan blade assembly.

The coil 50 is electrically energized from the vehicle battery 80 shown diagrammatically in FIG. 3 on the closing of a temperature sensitive switch or sensor 82 immersed in the cooling fluid circulated in radiator 12. The switch is connected to an electrical lead 86 extending centrally into cover 30 coaxial with shaft 14. The lead 86 projects axially through an insulator 85 and insert 87 mounted in a bearing 90 supported centrally by the cover 30. The lead 86 terminates in a contact heat 94. The inner end of a radially extending spring contact arm 96 is spring loaded against head 94. The contact arm 96 rotates with coil housing while maintaining contact with head 94. The outer end of arm 96 is supported by the outboard end of a contact 100 extending through an insulator 101 mounted in the housing 40 as shown in FIG. 2. Contact 100 electrically connects the contact arm 96 to the coil 50 so that on closure of thermal switch 82 the coil circuitry is completed to effect the electromagnetic attraction of the drive plate 58 into drive engagement with the coil plate 56. When this occurs, the housing 40 attached spring contact arm rotate with shaft 14. Element 104 is a restraining arm connected by a wire 106 to the radiator or other fixed support to prevent rotation of the insert 87.

In the disengaged mode of operation, there is no electrical signal from the sensor 82. With the engine running, pump shaft 14 will turn which will rotate the drive shoe, torque springs and drive plate. Since the coil is not energized, there will be no contact between the drive plate and the coil housing. Under such circumstances, the fan, body and coil housing free-wheel by only the friction of the bearing system and ram air through the radiator. In the engaged mode, with an electrical signal from the sensor and the engine running the shaft will turn which will rotate the drive shoe, torque spring and drive plate. Since the coil is energized, the drive plate contacts the coil housing driving it one to one. With the silicone fluid centrifugally forced into the working area or cavity 74, the body and fan will slip or rotate at a lower speed similar to a conventional viscous clutch. Since the viscous clutch provides for the progressive increase in rotational speed of the fan blading, conventional fan blades may be employed as opposed to the more complex and costly flex fan blading of prior art fan constructions.

While a preferred embodiment of the invention has been shown and described to illustrate the invention, other embodiments will become apparent to those skilled in the art. Accordingly, the scope of this invention is set forth in the following claims.

The embodiments of the invention in which an exclusive property or privilege is claimed are defined as follows:

1. A fan drive comprising rotatable input shaft means, drive shoe means mounted on said shaft means for rotation therewith, drive plate means supported by said drive shoe means, a housing disposed around said input shaft means, bearing means supporting said housing for rotation on said input shaft means, selectively electrically energizable coil means disposed in said housing for attracting said drive plate means into driving engagement with said housing so that said housing will be driven by said input shaft means, fan body means rotatably mounted on said input shaft means around said housing, said fan body means having a fluid chamber therein, said housing having a rotor which extends into said chamber, said chamber having a hydraulic fluid therein effective on predetermined rotational drive of said rotor by said input shaft means to transmit drive torque for the hydraulic drive of said fan body.

2. A fan drive comprising rotatable input shaft means, drive shoe means mounted on said input shaft means for rotation therewith, drive plate means supported by said drive shoe means, fan body means disposed around said input shaft means and said drive shoe means, said main fan body means having outwardly extending fan blades secured thereto, a coil housing supported for rotation on said input shaft means, selectively electrically energizable 50 coil means disposed in said coil housing means for magnetically attracting said drive plate means into driving engagement with said housing so that said housing will be driven by said input shaft means, said fan body means having a viscous fluid working chamber therein, said coil housing having a viscous clutch radially extending therein into said chamber, said chamber having a viscous fluid disposed therein effective in response to predetermined rotational drive of said coil housing for the viscous drive of said fan body means in response to energization of said coil means.

3. A fan drive comprising rotatable input shaft means, drive shoe means secured to said input shaft means for rotation therewith, drive plate means, torque spring means yieldably connecting said drive shoe means to said drive plate means, fan body means disposed around said input shaft means and said drive shoe means, a coil housing supported for rotation on said input shaft means, cover means secured to said fan body means and cooperating therewith to encase said coil housing, selectively energizable coil means disposed within said coil housing means for magnetically attracting said drive plate means into driving engagement with said coil housing so that said coil housing will be driven by said input shaft means, said fan body means having a viscous fluid working chamber therein, said coil housing having a viscous clutch radially extending therein into said chamber, said chamber having a viscous fluid disposed therein centrifugally displaced in response to predetermined rotational drive of said coil housing for the viscous drive of said fan body means in response to energization of said coil means and the rotational drive of said coil housing by said input shaft means.

* * * * *